June 4, 1963  E. DE NIET  3,092,779
CIRCUITS FOR CONVERTING ELECTRIC SIGNALS LOGARITHMICALLY
FOR DETECTORS AND THE LIKE
Filed July 3, 1959

INVENTOR
EDMOND DE NIET
BY
AGENT

3,092,779
CIRCUITS FOR CONVERTING ELECTRIC SIGNALS LOGARITHMICALLY FOR DETECTORS AND THE LIKE

Edmond de Niet, Eindhoven, Netherlands, assignor to North American Philips Company, Inc., New York, N.Y., a corporation of Delaware
Filed July 3, 1959, Ser. No. 824,867
Claims priority, application Netherlands July 12, 1958
9 Claims. (Cl. 329—103)

The present invention relates to circuit arrangements for converting an electric input signal, in particular an alternating voltage signal, into an output signal which is in logarithmic relationship with the input signal, by means of a rectifier, to which the input signal is supplied. As is known, a rectifier driven in its forward direction, in particular a rectifier of semi-conductive type, has a substantially exponential current-voltage characteristic; therefore, by passing the input signal as a current through the rectifier, a voltage drop is produced across the rectifier which is substantially proportional to the logarithm of the signal current and consequently to the logarithm of the signal voltage.

The invention has in particular for its object to use a circuit arrangement of this type in connection with input alternating voltage signals. However, the following difficulty is experienced: In one phase of the signal alternating voltage, the rectifier will be driven in its forward direction and consequently will produce a voltage proportional to the logarithm of the input signal voltage. In the opposite phase of the signal voltage, however, the rectifier will be driven in its blocking direction and consequently have such a high internal resistance that the voltage set up across it substantially corresponds to the input signal voltage itself. Hence, the relationship between the input voltage and the output voltage then is no longer logarithmical. This difficulty can be avoided by taking the output voltage from a resistor which is connected in series-combination with a second rectifier connected in parallel with the first rectifier, both rectifiers then being conductive during the same phase of the input signal voltage. Since, however, both the series-impedance to be connected between the source of signal voltage and the first-mentioned rectifier and said resistor should have high values relatively to the pass-resistance of the first-mentioned rectifier, a considerable amount of energy is thus wasted in the circuit arrangement.

The present invention mitigates this disadvantage and is characterized in that the rectifier is constituted by the emitter-base circuit of a transistor and in that the output signal, if desired after having been filtered, is taken from the otherwise non-fed circuit between the collector and the base of the transistor.

The invention is based on the realization known per se that the collector of a transistor, in the absence of a source of supply voltage between the collector and the base, assumes substantially the same potential as the emitter of the transistor. Since the emitter-base circuit of a transistor behaves as a rectifier having a substantially exponential current-voltage characteristic, a voltag varying practically logarithmically with the input signal voltage is also set up at the collector. The collector-base circuit can then be loaded with a comparatively low output resistor, for example a voltmeter having a comparatively low internal resistance, without appreciably detracting from the desired logarithmic characteristic.

It is known per se to convert, by means of a rectifier, a direct voltage signal into a voltage depending logarithmically upon it, which latter voltage is subsequently amplified by means of a transistor amplifier which is supplied with the direct voltage signal itself. In this case, the transistor has an essentially different function and is connected with supply voltage.

In order that the invention may be readily carried into effect, an example will now be described in detail with reference to the accompanying drawing, in which FIG. 1 represents a theoretical circuit diagram according to the invention;

Figure 1:
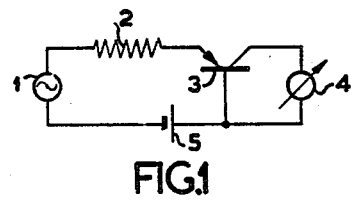

In FIG. 1 the reference numeral 1 designates a source of input signals for supplying alternating voltages. The source 1 is connected through a resistor 2, which may be constituted by the internal resistance of the source 1 itself, between the emitter and the base of a junction transistor 3. The resistor 2 has an impedance which is high relative to the emitter-base input resistance of the transistor 3. Consequently, the emitter-base path acts as a rectifier so that at the emitter a voltage is set up which, during the phase in which this voltage acts in the forward direction, is practically in logarithmic relationship with the voltage of the source 1. The collector of the transistor 3 then assumes substantially the same high voltage, which can be measured by means of a comparatively low ohmic voltmeter 4. During the opposite phase of the input signal of the source 1, the emitter-base circuit of the transistor 3 is cut off so that the emitter-voltage corresponds to the signal voltage. However, the collector-base voltage then is substantially zero, hence the logarithmic relationship is maintained.

The lowest value, which the meter 4 may practically be given, is usually lower than that of the resistor 2 and is determined by the minimum amplitude of the input signal voltage such that the current passing through the resistor 2, which current moreover passes substantially entirely through the meter 4, is able to produce across the latter substantially the same voltage drop as then occurs between the emitter and the base of the transistor 3. For example, a resistor 2 of 2 kilohms permitted the use of a meter 4 having a resistance as low as 680 ohms. The range over which the logarithmic relationship holds may, if desired, be adjusted by means of a source 5 producing a low reverse voltage of, say, 0.1 v. in the emitter-base circuit. With the component values indicated above, this permitted a range of 50 db variation of the input signal voltage.

The produced output signal may, if required after amplification, also be supplied to an oscillograph for making visible phenomena on a logarithmic scale. As an intermediate amplifier, a transistor may again be used with advantage on account of its low input impedance. Alternatively, an impedance-matching transformer may, if desired, be interconnected. A further use is, for example, in the field of balanced frequency discriminators where, as is known, the use of logarithmic detector diodes yields an output signal which is practically independent of undue amplitude modulations of the input signal.

Figure 2:
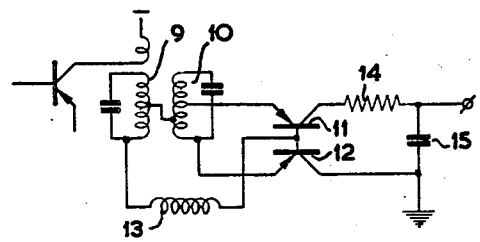
FIGS. 2 and 3 show two variants, in which the principle of the invention is used in a frequency detector.

FIG. 2 shows an example of such a frequency discriminator. After impedance-matching transformation, the input signals are supplied through substantially critically coupled circuits 9 and 10 tuned to their central frequency to the emitter-base circuits of transistors 11 and 12. The series-connected resistor 2 shown in FIG. 1 has been replaced by a series-inductance 13 common to both transistors. The push-pull output filter comprises a capacitor 15, which constitutes a short-circuit to the input signal oscillations but a high impedance to the modulation oscillation, and moreover a series-resistor 14 which permits the use of a comparatively low-value capacitor 15.

Figure 3:
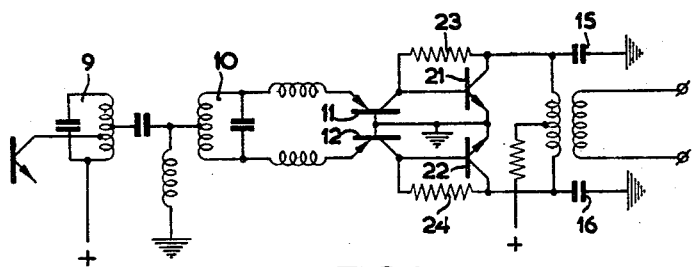

In the variant shown in FIG. 3 two rather critically coupled circuits 9 and 10 tuned to the central frequency of the oscillations to be demodulated are again used, the oscillations of which circuits are supplied to the emitters of transistors 11 and 12. These transistors are connected with respect to direct current to transistors 21 and 22 of opposed conductivity type, which are moreover connected as push-pull amplifiers for the demodulated signal. Capacitors 15 and 16 again serve to decouple the input signal oscillations from the demodulated oscillations. If desired, negative feedback resistors 23 and 24 may further be used for improving the linearity of the push-pull amplifier 21, 22, which resistors 23 and 24 moreover decrease the input impedance of the transistors 21 and 22 so that, in spite of the negative feedback, they scarcely give rise to loss of amplification.

It may be advantageous to connect the emitter-electrodes and collector electrodes of a transistor the other way about in the circuit arrangements represented so that its collector electrode is operated as an emitter and its emitter-electrode is operated as a collector. As a matter of fact, the collector electrode of a commercial transistor is often able to stand a reversed voltage higher than does its emitter-electrode, so that higher signal alternating voltages, for example up to 30 v., are permissible. Furthermore, the surface of the collector-electrode is often larger than that of the emitter-electrode, and the collector input resistance of a collector-base junction operated in the forward direction, consequently as an emitter, lower than that of the like emitter-base junction.

Figure 4:
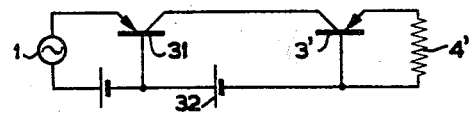
FIG. 4 is a variant of FIG. 1.

FIG. 4 shows a circuit arrangement of this type, in which the relevant transistor 3' is preceded by a transistor 31 converting the signal voltage of the source 1 into a proportional current. This transistor 31 has a high internal resistance, thus rendering unnecessary the series-impedance 2 and 13 respectively. The supply 32 operates the collector-base path of the transistor 31 in reversed direction and that of the transistor 3' in the forward direction. Consequently, a voltage in logarithmic relationship with the signal voltage of the source 1 is again produced across the last-mentioned collector-base path, which voltage is transmitted to the low-ohmic load 4'.

What is claimed is:

1. A circuit arrangement for converting an alternating input signal into an output signal which is a logarithmic function of said input signal, comprising a transistor having an input electrode system, an output electrode system and a base electrode which is common to said electrode systems, bias means for biasing said input electrode system in the reverse direction, said bias means constituting the sole bias source for said transistor, means for applying said input signal to said input electrode system, and sensing means for sensing the output signal on said output electrode system, said output signal being a logarithmic function of said input signal.

2. A circuit arrangement as claimed in claim 1, wherein said input electrode system comprises the emitter of the transistor and said output electrode system comprises the collector of said transistor.

3. A circuit arrangement as claimed in claim 2, further including an impedance connected between the emitter and the base of the transistor, said sensing means comprising a resistive element having a resistance lower than said impedance.

4. A balanced frequency detector comprising a pair of transistors, each transistor having an input electrode system, an output electrode system and a base electrode, said output electrode system being unbiased said base electrodes being connected directly together, means for applying a frequency modulated signal to said input electrode systems and derivation means connected to said output electrode systems for deriving therefrom the modulating portion of said frequency modulated signal.

5. A detector as claimed in claim 4, said derivation means comprising a second pair of transistors of opposite conductivity type connected in push-pull arrangement, the emitters of said second pair of transistors being directly connected together, the bases of said second pair of transistors being conductively connected for direct current respectively to said output electrode systems, and means for deriving an amplified demodulated signal comprising a transformer having a primary winding whose terminals are connected to the collector electrodes of said second pair of transistors.

6. A circuit arrangement as claimed in claim 1, wherein said input electrode system comprises the collector of the transistor and said output electrode system comprises the emitter of said transistor.

7. A circuit arrangement for converting an alternating input voltage into an output voltage which is a logarithmic function of said input voltage comprising a transistor having emitter, base, and collector electrodes, means to supply the input voltage between said emitter and base electrodes through an impedance effecting an emitter to base voltage which is a logarithmic function of said input voltage means to connect said collector to said base electrode through a load effecting a forward bias potential between said collector and said base electrode which is nearly equal to said emitter to base voltage.

8. A circuit arrangement for converting an alternating input voltage into an output voltage which is a logarithmic function of said input voltage comprising first and second transistors each having emitter, base, and collector electrodes, means to supply the input voltage between the emitter and base electrodes of said first transistor, means to provide a direct current connection between the collector electrodes of said transistors, means to interconnect the base electrodes of said transistors to produce a reversed bias voltage between the base and the collector electrodes of said first transistor, and a load impedance connected between the emitter and the base electrode of said second transistor to effect nearly equal forward voltages at the collector as at the emitter electrode of said second transistor which is a logarithmic function of said input voltage.

9. A circuit arrangement for converting an alternating input signal into an output signal which is a logarithmic function of said input signal, comprising a transistor having an input electrode system, an output electrode system and a base electrode which is common to said electrode systems, means for applying said input signal to said input electrode system, and sensing means for sensing the output signal on said output electrode system, said output electrode system being unbiased, said output signal thereby being a logarithmic function of said input signal.

References Cited in the file of this patent
UNITED STATES PATENTS

| | | |
|---|---|---|
| 2,313,666 | Peterson | Mar. 9, 1943 |
| 2,486,776 | Barney | Nov. 1, 1949 |
| 2,864,002 | Straube | Dec. 9, 1958 |
| 2,986,648 | Willems et al. | May 30, 1961 |